UNITED STATES PATENT OFFICE.

WALTER K. FREEMAN, OF OSCAWANA, NEW YORK, ASSIGNOR TO HYDROLOSE PROCESS CORPORATION, A CORPORATION OF NEW YORK.

INSULATING COMPOSITION.

1,175,424.  Specification of Letters Patent.  Patented Mar. 14, 1916.

No Drawing.  Application filed November 25, 1913.  Serial No. 803,046.

*To all whom it may concern:*

Be it known that I, WALTER K. FREEMAN, a citizen of the United States, residing at Oscawana, in the county of Westchester and State of New York, have invented certain new and useful Improvements in Insulating Compositions; and I do hereby declare the following to be a full, clear, and exact description of the invention, such as will enable others skilled in the art to make and use the same.

My invention relates to insulating compounds and articles made therefrom, and the object of my invention is to produce an article of high insulating properties which is light, tough, thoroughly moisture-proof and unaffected by atmospheric conditions, and to this end, I utilize as an ingredient of my insulating compound, a large percentage of the wood derivatives recovered from the sulfite waste liquor of wood pulp mills.

In my co-pending application, Serial Number 803,043 filed on even date herewith, I have described a method of recovering from the sulfite waste liquor of wood pulp mills, by adding to condensed sulfite liquor first, a soluble chlorid, such as hydrochloric acid, and then an alkali, ammonia, the wood derivatives and also the sulfurous acid and calcium constituents in the form of substantially neutral inert substances, and I have used the word "xylium" to designate broadly the substantially neutralized inert recovered product whether in a syrupy or dry state. Another suggestion in the same case is the use first of sodium chlorid and then of barium chlorid. To the products of the latter treatment, the same term is applicable. It was pointed out in that application that if the wood derivatives were to be recovered and separated from the sulfurous acid and calcium constituents of the liquor, the liquor was concentrated, treated with a chloridic agent, such as hydrochloric acid or sodium chlorid, and then treated with a suitable precipitant agent as ammonia or barium chlorid in limited quantity to effect precipitation of the sulfur and calcium compounds of the liquor, after which the syrupy mass containing the wood derivatives of the liquor was drawn off from the precipitate and then bleached if desired, and evaporated down to a dry mass and ground into powder. I termed this recovered substance containing the wood derivatives separated from the precipitates, whether in the syrupy or powdered state, "xylozo." It was also pointed out that if the wood derivatives and neutralized sulfurous acid and calcium ingredients were to remain unseparated in the neutralized mixture, the mixture could be treated so as to effect precipitation of the sulfur calcium compounds, or it could be treated in such a way as to simply convert such compounds into inert substances suspended through the mass, as may be desired; and I termed this resulting mixture, whether in the syrupy or anhydrous state, "xylosca."

In this specification, I will use the terms "xylium," "xylosca" and "xylozo" in the sense stated, to designate the neutralized products recovered from the sulfite waste liquor.

In order that those skilled in the art may thoroughly understand my invention and the method of practising the same, I will describe in detail what I believe to be the best method of carrying out my invention.

I mix and grind together disintegrated dry "xylium" a small percentage of disintegrated dry resin or suitable gum, such as gum copal, a suitable amount of a powdered metallic oxid and chlorid, and preferably a suitable amount of disintegrated hard refractory material, such as ground glass, mica, crushed marble or other material of high insulating properties. These ingredients are thoroughly intermixed and reduced to powdered form, as by grinding them together, and to the resulting powder is added water in quantity just enough to cause the occurrence of the chemical action necessary to convert the oxid with the chlorid into an oxy-chlorid bond. This will be effected if the powdered mixture is moistened just enough so that it will retain its form if confined under pressure. The powder having a suitable percentage of moisture is then packed in a suitable mold and subjected to heavy pressure to consolidate it and to hasten the chemical action.

The articles being thus formed are taken from the molds and indurated by first dipping them in a solution of barium chlorid and then into a solution of aluminum sulfate and dried, after which they are dipped in a weak solution of sulfuric acid and again dried. The articles may then be polished by tumbling them with sawdust. In this manner any suitable form of electrical insulators such as rosettes, cleats, switch slabs, or ornaments, or other useful articles may be made, or if desired, the moistened powder may be forced through dies under pressure to form rods or tubes, which may be indurated as above described.

I have found in practice that the following proportion of the different ingredients form a composition from which highly satisfactory insulating articles may be made:—approximately 30 parts by weight of dry "xylium," approximately 20 parts by weight of dry magnesium oxid, approximately 10 parts by weight of dry magnesium chlorid, approximately 5 parts by weight of resin or other suitable hard gum, and preferably from 20 to 200 parts of a suitable material of high electrical resistance, such as powdered glass.

It will be obvious to those skilled in the art, after this disclosure of my invention, that various changes and substitutions may be made in the method of mixing the different ingredients and in the proportions and ingredients used. For instance, it is immaterial to my invention whether the metal chlorid be added in the dry form and ground up with the other ingredients, or whether the other ingredients are first ground together and the chlorid added in the form of a very concentrated solution and used to moisten the powdered mixture of the other ingredients, so long as sufficient chlorid is present in the solution to effect, with the oxid, the bonding action; and, if desired, any suitable metal oxy-chlorid, such as zinc, barium or aluminum oxy-chlorid, or a compound oxy-chlorid may be used instead of the magnesium oxy-chlorid; and, if desired, silica may be substituted for the crushed glass, marble, or other refractory ingredient, in which case the resulting article may be more readily worked with tools. I have also found in practice that a suitable mineral oil used with or in place of the resin or other gum, gives very satisfactory results, since such an oil will harden under the oxy-chlorid bond, and avoids any stickiness in the composition, also, instead of indurating the articles, they may be vulcanized by proper treatment with sulfur and heat, if desired.

Having thus described my invention, what I claim as new and desire to secure by Letters Patent, is:

1. A new composition of matter for insulating purposes comprising sulfite cellulose liquor, concentrated, treated with a chloridic reagent, and then with an agent adapted to precipitate sulfur and calcium compounds from the liquor, dried with the precipitate therein and ground, an oxid and chlorid capable of reacting to make an oxy-chlorid binding agent, and a small percentage of gum.

2. A new composition of matter for insulating purposes comprising sulfite cellulose liquor, concentrated, treated with a chloridic reagent, and then with an agent adapted to precipitate sulfur and calcium compounds from the liquor, dried with the precipitate therein and ground, an oxid and chlorid capable of reacting to make an oxy-chlorid binding agent, a powdered refractory material, and a small percentage of gum.

3. A new composition of matter for insulating purposes comprising sulfite cellulose liquor, concentrated, treated with a chloridic reagent, and then with an agent adapted to precipitate sulfur and calcium compounds from the liquor, dried with the precipitate therein and ground, an oxid and chlorid capable of reacting to make an oxy-chlorid binding agent, a suitable inert matter of high insulating properties, and a small percentage of gum.

In testimony whereof I affix my signature, in the presence of two subscribing witnesses.

WALTER K. FREEMAN.

Witnesses:
JNO. S. GEORGE.
CLARENCE W. HODGE.